(12) United States Patent
Satou et al.

(10) Patent No.: US 6,713,705 B1
(45) Date of Patent: Mar. 30, 2004

(54) WIRE ELECTRIC DISCHARGE MACHINING METHOD AND WIRE ELECTRIC DISCHARGE MACHINE UTILIZING PRESSURIZED GAS FOR REMOVING MACHINING SOLUTION

(75) Inventors: Seiji Satou, Tokyo (JP); Akihiro Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/148,545
(22) PCT Filed: Oct. 5, 2000
(86) PCT No.: PCT/JP00/06960
§ 371 (c)(1), (2), (4) Date: Jun. 4, 2002
(87) PCT Pub. No.: WO02/28581
PCT Pub. Date: Apr. 11, 2002

(51) Int. Cl.⁷ ................................................ B23H 7/02
(52) U.S. Cl. .................. 219/69.12; 219/69.17
(58) Field of Search ............................ 219/69.12, 69.17

(56) References Cited

U.S. PATENT DOCUMENTS 4,547,647 A * 10/1985 Schneider ................. 219/69.12

FOREIGN PATENT DOCUMENTS

JP  7-266137 A  * 10/1995
JP  9-239622      9/1997

OTHER PUBLICATIONS

"Micro–Machining by EDM in Gas" by Masahiro Yoshida and Masanori Kunieda, Tokyo University of Agriculture and Technology.

"Improvement of Accuracy of Second–Cut using Dry WEDM" Kunio Adachi et al of Tokyo University of Agriculture and Technology.

Japan Society for Precision Engineering, article in 1999, p. 415, "Micro–Machining by EDM in Gas" by Masahiro Yoshida et al of Tokyo University of Agriculture and Technology.

* cited by examiner

*Primary Examiner*—Geoffrey S. Evans
(74) *Attorney, Agent, or Firm*—Sughrue Mion, PLLC

(57) ABSTRACT

A workpiece is machined by consecutively performing at least two of machining in a machining solution, machining in a mist and machining in a gas, such that at a point of time before the start of machining, except for the machining conducted in the machining solution, and a point of time after the operation of an automatic wire connecting device for conducting an automatic wire connection while the wire electrode is being held by a water column, the machining solution nozzles, can change from supplying the machining solution to supplying the pressurized gas. By the machining solution nozzles, liquid of the machining solution adhering to the workpiece and liquid adhering to the machining solution nozzle which is capable of dripping onto a face to be machined of the workpiece, are removed.

7 Claims, 10 Drawing Sheets

WIRE ELECTRIC DISCHARGE MACHINING METHOD AND WIRE ELECTRIC DISCHARGE MACHINE UTILIZING PRESSURIZED GAS FOR REMOVING MACHINING SOLUTION

This application is a 371 of PCT/JP00/0660, filed Oct. 5, 2000.

1. Technical Field

The present invention relates to improvements in a wire electric discharge machining method and a wire electric discharge machine in which electric power is supplied between a wire electrode and a workpiece so that a workpiece is machined by electric discharge energy generated between the wire electrode and the workpiece.

2. Background Art

Electric discharge machining has acquired a steadfast position as a technique for machining metallic dies and others. Therefore, electric discharge machining has been widely used for machining metallic dies in the automobile industry, electric appliance industry and semiconductor industry.

FIGS. 8A to 8E are schematic illustrations for explaining a mechanism of electric discharge machining. In the drawing, reference numeral 1 is an electrode, reference numeral 2 is a workpiece, reference numeral 3 is an arc column, reference numeral 4 is a machining solution and reference numeral 5 represents chips created in the process of electric discharge machining. While the following processes (a) to (e), which correspond to FIGS. 8A to 8E, are being repeatedly conducted, removal machining is conducted on the workpiece 2 by electric discharge. Each process proceeds as follows.

(a) Formation of the arc column 3 by the generation of electric discharge (b) Local melt of the workpiece and vaporization of the machining solution 4 by the thermal energy of electric discharge (c) Generation of vaporizing explosive power by the machining solution 4

(d) Dispersion of the melted portion (chips 5)

(e) Cooling, coagulation and restoration of insulation between the electrodes executed by the machining solution The present invention relates to wire electric discharge machining used for gouging, cutting and so forth. Concerning the technique of wire electric discharge machining, there is a strong demand for higher accuracy. For example, when metallic dies used in the field of manufacturing semiconductors, the dimensional accuracy of which is high, are machined, it is necessary to conduct machining with high accuracy of 1 to 2 $\mu$m.

FIGS. 9A to 9C are schematic illustrations showing an example of the wire electric discharge machining process. In the drawing, reference numeral 1a is a wire electrode, reference numeral 2 is a workpiece, reference numeral 4a is water which is a machining solution, and reference numeral 6 is an initial hole. FIG. 9A shows a first cut process which is a rough machining process, FIG. 9B shows a second cut process which is an intermediate finishing process to be conducted after the rough machining process, and FIG. 9C shows a third cut process which is a final finishing process.

An example of the first cut process shown in FIG. 9A shows a gouging process in which the wire electrode 1a is threaded into the initial hole 6 and the workpiece 2 is gouged by electric discharge. In the case of the first cut process described above, since the surface roughness and the accuracy are finished in the later process, it is unnecessary to machine the workpiece with high accuracy, and it is important to increase a rate of machining so as to enhance the productivity. In order to enhance the rate of wire electric discharge machining, water 4a is jetted out between the electrodes so that chips can be effectively ejected from between the electrodes. In order to spray water 4a between the electrodes uniformly and prevent the breaking of the wire electrode 1a, a method is adopted in which water 4a is stored up in a machining tank and the workpiece 2 is dipped in the water 4a. As described above, a means for supplying a machining solution between the electrodes is used.

In the conventional wire electric discharge machining method described above, the second cut process (shown in FIG. 9B), which is conducted after the first cut process (shown in FIG. 9A), and the third cut process (shown in FIG. 9C), are conducted in the water 4a which is a machining solution.

FIG. 10 is a view showing an example of the waveforms of voltage and current between the electrodes. In the view, V is a voltage between the electrodes, and I is a current between the electrodes, and t is time. A state at time T1 in FIG. 10 shows that voltage is impressed between the wire electrode 1a and the workpiece 2. When voltage is impressed between the electrodes, an attraction force acts between the positive and the negative polarity. By this electrostatic force, the wire electrode 1a, the rigidity of which is low, is drawn onto the workpiece 2 side, which could be a cause of vibration of the wire electrode 1a. Due to the vibration, it becomes difficult to conduct electric discharge machining with high accuracy.

A state at time T2 in FIG. 10 shows that vaporizing explosive power is generated in the machining solution by electric discharge energy (for example, shown in FIG. 8C). The wire electrode 1a is given a strong force by the vaporizing explosive power created in the machining solution in a direction opposite to the workpiece 2, and vibration is generated. Due to the vibration, irregularities are caused on the profile of the workpiece 2, which impairs the dimensional accuracy.

In the industry of semiconductors in which wire electric discharge machining is utilized, the following cases are increased. For example, in the case of machining metallic dies of IC lead frames, very high accuracy and very smooth surface roughness are required when a workpiece is machined, the dimensional accuracy of which is 1 $\mu$m, and the surface roughness of which is not more than 1 $\mu$m Rmax. In the case where high accuracy and smooth surface roughness are required as described above, remarkable problems are caused by the aforementioned vibration of the wire electrode.

DISCLOSURE OF THE INVENTION

The present invention has been accomplished to solve the above problems. It is an object of the present invention to provide a wire electric discharge machining method and a wire electric discharge machine suitable for conducting electric discharge machining with high accuracy and reliability.

The present invention provides a wire electric discharge machining method in which electric discharge is generated between a wire electrode and a workpiece so as to machine the workpiece by electric discharge, comprising the steps of: machining the workpiece while at least two types of machining in three types of machining including machining in a machining solution, machining in mist and machining in gas are being combined with each other; and removing at least one of the liquid of the machining solution adhering to the workpiece and the liquid of the machining solution having a possibility that the liquid drips onto a machining face of the workpiece at least at one of the point of time before the start of machining except for the machining conducted in the machining solution and the point of time after the operation of an automatic wire connecting device for conducting an automatic wire connection while the wire electrode is being held by a water column.

The present invention provides a wire electric discharge machine in which electric discharge is generated between a wire electrode and a workpiece so as to machine the workpiece by electric discharge, comprising: at least one of the machining solution supply means for supplying a machining solution between the electrodes and the mist supply means for supplying mist between the electrodes; pressurized gas jetting means for removing at least one of the liquid of the machining solution adhering to the workpiece and the liquid of the machining solution having a possibility that the liquid drips onto a machining face of the workpiece at least at one of the point of time before the start of machining except for the machining conducted in the machining solution and the point of time after the operation of an automatic wire connecting device for conducting an automatic wire connection while the wire electrode is being held by a water column; and positioning means for positioning by relatively moving the workpiece and the pressurized gas jetting means.

Also, the present invention provides a wire electric discharge machine in which electric discharge is generated between a wire electrode and a workpiece so as to machine the workpiece by electric discharge, comprising: at least two of the machining solution supply means for supplying a machining solution between the electrodes, the mist supply means for supplying mist between the electrodes and the gas supply means for supplying gas between the electrodes; pressurized gas jetting means for removing at least one of the liquid of the machining solution adhering to the workpiece and the liquid of the machining solution having a possibility that the liquid drips onto a machining face of the workpiece at least at one of the point of time before the start of machining except for the machining conducted in the machining solution and the point of time after the operation of an automatic wire connecting device for conducting an automatic wire connection while the wire electrode is being held by a water column; and positioning means for positioning by relatively moving the workpiece and the pressurized gas jetting means.

Also, the present invention provides a wire electric discharge machine in which the pressurized gas jetting means is a machining solution nozzle capable of changing over a fluid to be supplied between the machining solution and the pressurized gas.

Also, the present invention provides wire electric discharge machine in which a relative movement of the workpiece with the pressurized gas jetting means made by the positioning means is conducted according to a program for machining the workpiece.

The wire electric discharge machining method and wire electric discharge machine of the present invention are composed as described above, and it is possible to combine the machining in a machining solution, the machining in mist and the machining in gas with each other, and further it is possible to utilize the essential characteristic of each machining. Therefore, it is possible to provide an effect that a highly reliable wire electric discharge machining method and wire electric discharge machine, which are appropriately used for machining with high accuracy, can be obtained.

BEST MODE FOR CARRYING OUT THE INVENTION

Figure 1A:
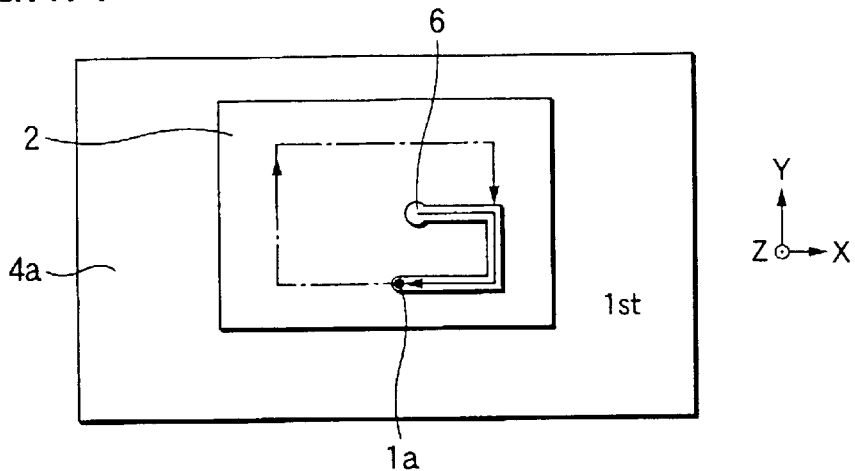
FIGS. 1A to 1C are schematic illustrations showing an example of a wire electric discharge machining method of an embodiment of the present invention.
Figure 1B:
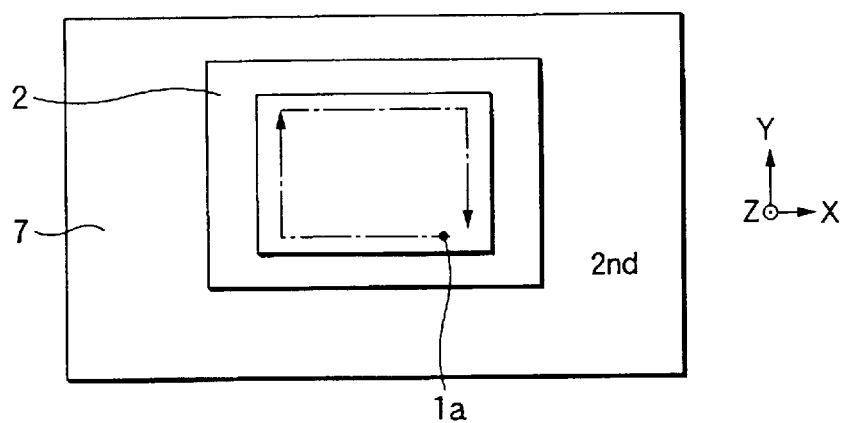
Figure 1C:
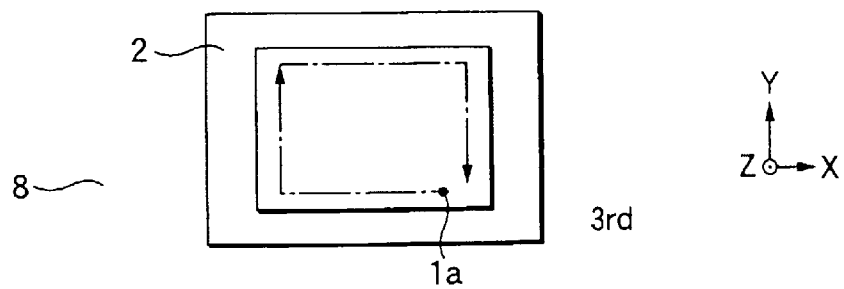

FIG. 1 is a schematic illustration showing an example of a wire electric discharge machining method of an embodiment of the present invention. In the drawing, reference numeral 1a is a wire electrode, reference numeral 2 is a workpiece, reference numeral 4a is water which is a machining solution, reference numeral 6 is an initial hole, reference numeral 7 is mist such as water and reference numeral 8 is gas such as air. FIG. 1A is a view showing a first cut process in which rough machining is conducted, FIG. 1B is a view showing a second cut process in which intermediate machining is conducted after the rough machining and FIG. 1C is a view showing a third cut process in which final machining is conducted. In this case, the first, the second and the third cut process are expediently determined. Therefore, wire electric discharge machining is not necessarily completed in the above three processes. In the case where electric discharge machining is conducted with low accuracy because the required accuracy is low, only the first cut process is conducted or alternatively only the first and the second cut process are conducted. In the case where the required accuracy is high, the cutting process is conducted by seven or eight times.

Figure 9A:
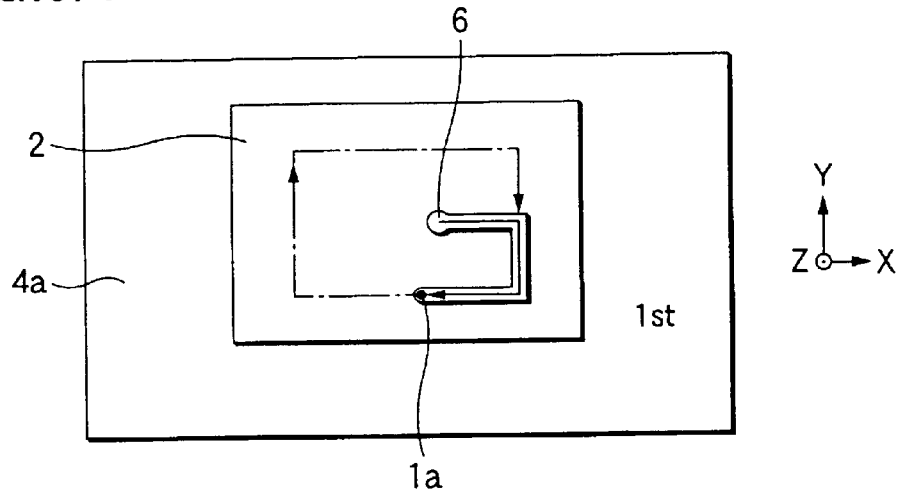
FIGS. 9A to 9C are schematic illustrations showing a machining process of wire electric discharge machining.
Figure 9B:
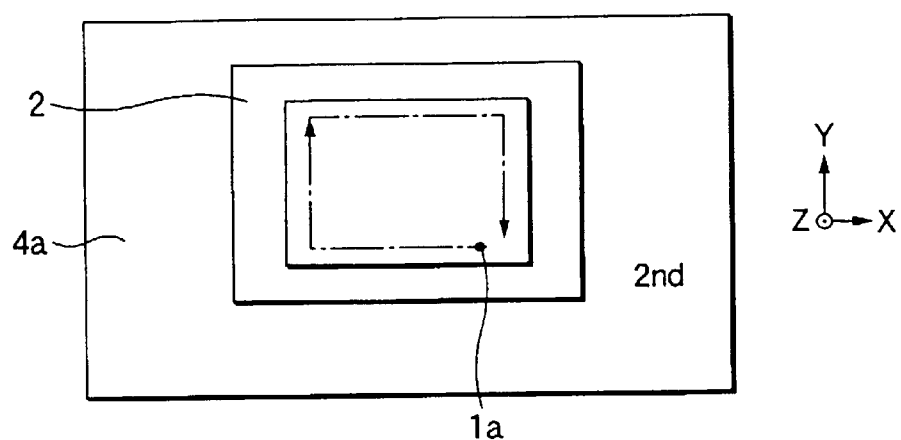
Figure 9C:
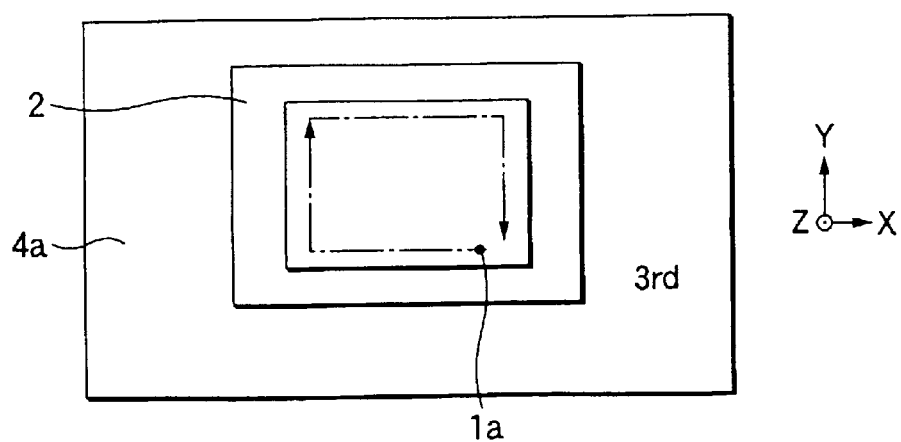
Figure 10:
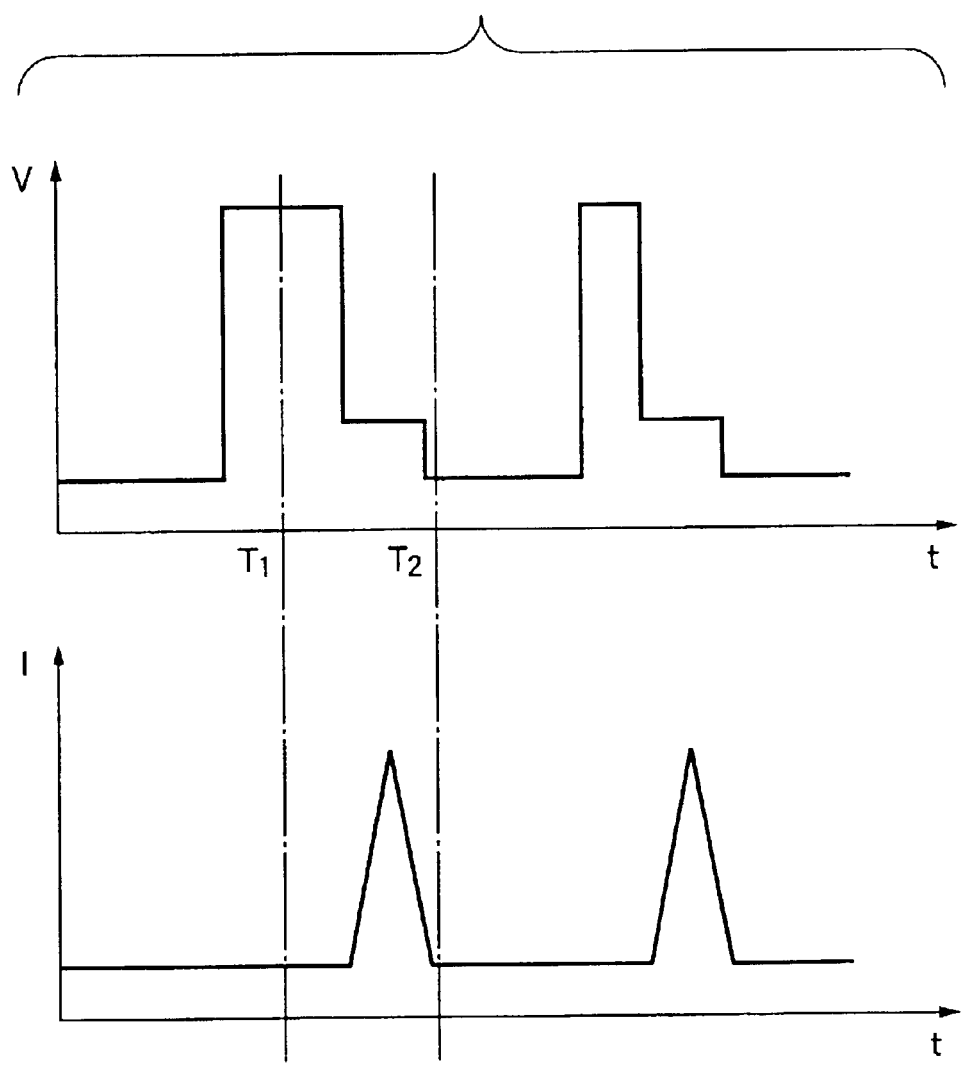
FIG. 10 is a view showing an example of waveforms of voltage and current impressed between electrodes.

Next, an outline of the machining method will be explained below. In the first cut process shown in FIG. 1A, the wire electrode 1a is threaded in the initial hole 6, and the workpiece 2 is gouged. In the first cut process, it is not required to conduct machining with such severe surface roughness and high dimensional accuracy because machining is conducted in the later process with severe surface roughness and high dimensional accuracy. Therefore, in the first cut process, it is important to increase a rate of machining so that the productivity can be enhanced. In the same manner as that of the background art shown in FIGS. 9A to 9C, electric discharge machining is conducted while water 4a, which is a machining solution, is being interposed between the electrodes by the machining solution supply means for supplying a machining solution between the electrodes. Concerning this machining solution supply means, at least either the means for dipping the workpiece 2 in water 4a in a machining tank or the means for jetting out water 4a between the electrodes is used.

In the usual wire electric discharge machining, machining is continued while the machining solution is being supplied between the electrodes by the machining solution supply means even after the completion of the first cut process. However, as described in the background art, problems such as vibration of the wire electrode are caused in this case. Therefore, it is not appropriate for machining with high accuracy. The present invention is characterized in that dimensional accuracy and surface roughness are improved by conducting electric discharge machining while a machining solution is not being interposed between the electrodes in the finishing process.

In the second cut process shown in FIG. 1B which is an intermediate finishing process, in order to improve the accuracy of a profile to be machined by suppressing the occurrence of vibration of the wire electrode 1a, electric discharge machining is conducted not in the machining solution 4a but in the mist 7. A rate of machining conducted in the mist 7 is by no means inferior to that conducted in the machining solution 4a. Since the occurrence of vibration of the wire electrode 1a caused by an electrostatic force is suppressed, the machining accuracy can be enhanced. Electric discharge machining in the mist 7 can be conducted when the mist is jetted out between the wire electrode 1a and the workpiece 2, for example, by the mist supply means not shown.

In the third cut process shown in FIG. 1C which is the final finishing process, when electric discharge is conducted in the gas 8, the occurrence of vibration of the wire electrode 1a can be further suppressed. Machining in the gas 8 is conducted in the atmosphere. Alternatively, machining in the gas 8 is conducted when gas of a predetermined composition is jetted out between the wire electrode 1a and the workpiece 2 by the gas supply means not shown.

The reason why it is possible to conduct electric discharge machining with high accuracy in the mist 7 or the gas 8 is described as follows. Since an intensity of the electrostatic force, which acts on the wire electrode 1a and the workpiece 2 when voltage is impressed between the electrodes, is proportional to the dielectric constant between the electrodes. Therefore, when the distances between the electrodes are the same, the intensity of the electrostatic force in the case where the mist 7 or gas 8 is interposed between the electrodes is one several tenth of that in the case where the water 4a is interposed between the electrodes. (For example, the dielectric constant is the lowest in vacuum and approximately 80 times as high as that in water.) Since the vaporizing explosive power caused by electric discharge is generated by liquid existing between the electrodes, when only the mist 7 or gas 8 exists between the electrodes, the wire electrodes 1a is seldom affected by the vaporizing explosive power.

Accordingly, it is possible to conduct electric discharge machining with high accuracy in the mist 7 or gas 8. Therefore, when machining conducted in the machining solution, machining conducted in the mist and machining conducted in the gas are appropriately combined with each other according to the productivity and the dimensional accuracy required for the workpiece, it is possible to satisfy the required specification.

In the case where wire electric discharge machining is conducted while machining in the machining solution, machining in the mist and machining in the gas are being combined with each other as described above, machining in the machining solution is changed over to machining in the mist, machining in the machining solution is changed over to machining in the gas, and machining in the mist is changed over to machining in the gas.

Figure 2:
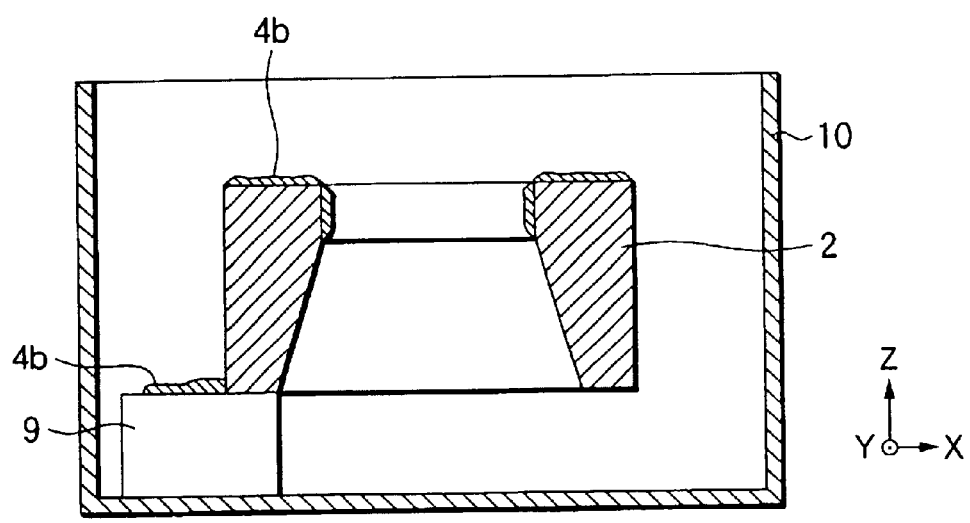
FIG. 2 is a schematic illustration showing a state in which a machining solution has been ejected after the completion of rough machining conducted in the machining solution.

FIG. 2 is a schematic illustration showing a state in which the machining solution has been ejected after the completion of rough machining conducted in the machining solution. After this, electric discharge machining is conducted in gas, which will be explained below. In FIG. 2, reference numeral 2 is a workpiece, reference numeral 4b is a residual machining solution, reference numeral 9 is a surface plate and reference numeral 10 is a machining tank. The residual machining solution 4b adheres onto an upper face and a face to be machined of the workpiece 2. Even when electric discharge machining is conducted in gas under the condition that the residual machining solution 4b adheres to the workpiece 2, it is impossible to provide the proper machining characteristic of electric discharge conducted in gas. Therefore, it is necessary to appropriately remove the residual machining solution 4b which has adhered to the workpiece 2. Especially in the case of electric discharge conducted in gas, even when a small quantity of residual solution 4b adheres to the workpiece 2, it is impossible to provide the original machining characteristic in gas. Therefore, it is highly necessary to remove the residual machining solution 4b which has adhered to the workpiece 2.

In FIG. 2, explanations are made into a case in which the residual machining solution 4b adheres to the workpiece 2. However, there is a possibility that the residual machining solution 4b adhering to the machining solution nozzle, which is arranged in an upper portion of the workpiece 2, drips onto a face to be machined of the workpiece 2 which is being machined by electric discharge in gas. Therefore, it is necessary to remove the residual machining solution 4b not only from the workpiece 2 but also from the machining solution nozzle.

Also, in the case of changing over from the machining process conducted in the machining solution to the machining process conducted in the mist, or also in the case of changing over from the machining process conducted in the mist to the machining process conducted in the gas, it is necessary to remove the machining solution adhering to the workpiece 2.

In order to automatize wire electric discharge machining, an automatic wire connecting device is commonly used. This automatic wire connecting device operates in such a manner that water is jetted out in the process of connecting the wire electrode 1a so as to hold the wire electrode 1a, the rigidity of which is low, by a water column, and the wire electrode 1a is automatically connected. This automatic wire connecting device is used when electric discharge machining is started from the initial hole or when the breaking of the wire electrode 1a has happened.

Figure 3:
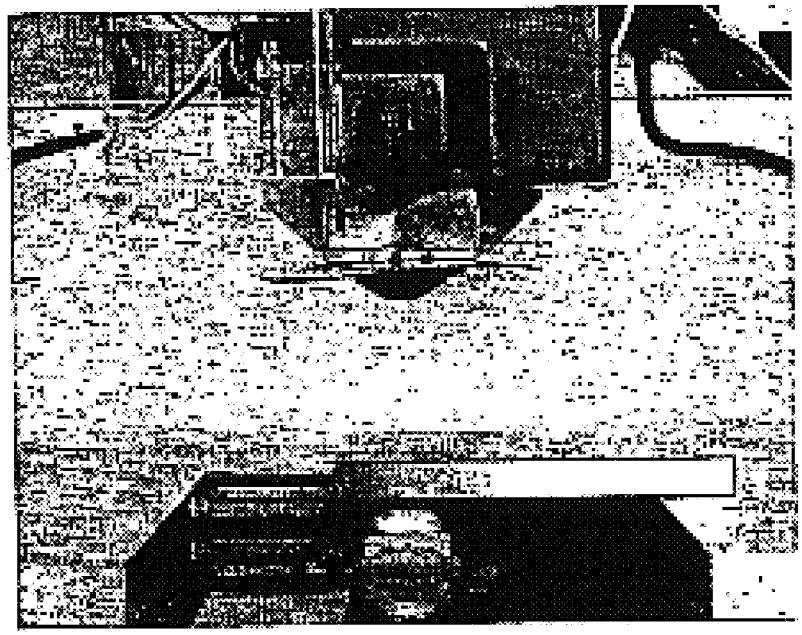
FIG. 3 is a photograph of a workpiece taken after an automatic wire connecting device has been operated.

FIG. 3 is a photograph of the workpiece taken after the completion of operation of the automatic wire connecting device. As can be seen in FIG. 3, water, which has jetted out in the automatic wire electrode connecting process, scatters and remains on an upper face of the workpiece. Accordingly, it is necessary to remove water which has adhered to the workpiece in the process of operation of the automatic wire connecting device.

Figure 4:
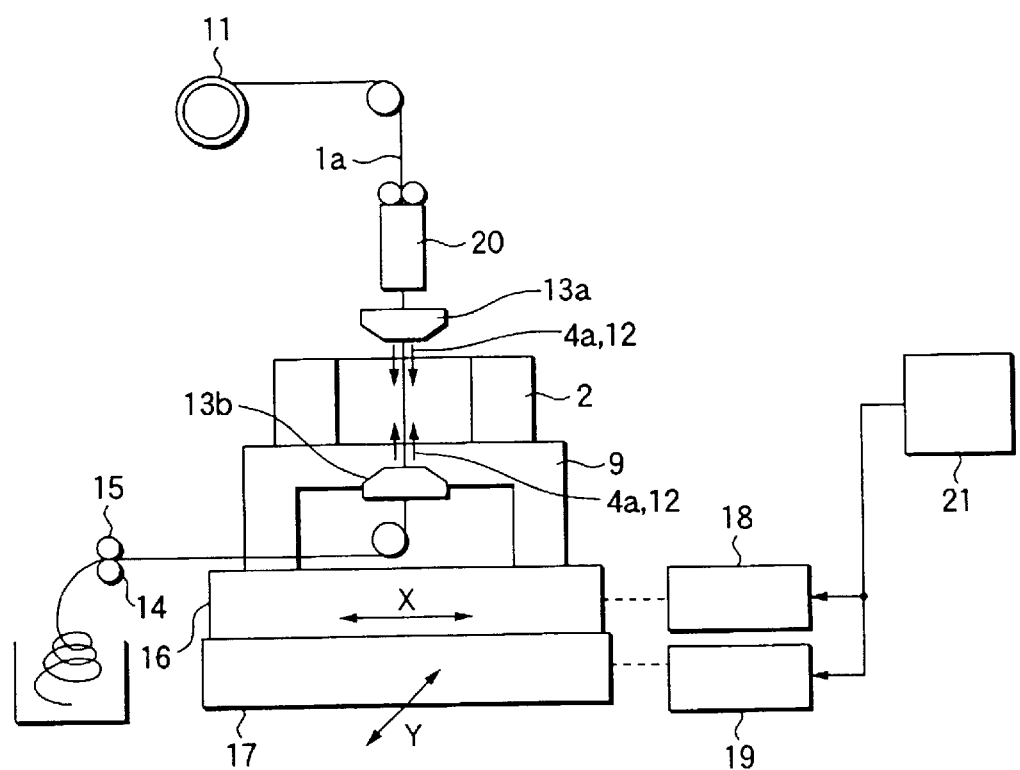
FIG. 4 is an arrangement view showing a wire electric discharge machine of an embodiment of the present invention.

FIG. 4 is an arrangement view showing a wire electric discharge machine of an embodiment of the present invention. In the drawing, reference numeral 1a is a wire electrode, reference numeral 2 is a workpiece, reference numeral 4a is water which is a machining solution, reference numeral 9 is a surface plate for fixing the workpiece 2, reference numeral 11 is a wire bobbin, reference numeral 12 is a pressurized gas, reference numerals 13a and 13b are nozzles for jetting out a machining solution, reference numeral 14 is a capstan roller, reference numeral 15 is a pinch roller, reference numeral 16 is an X table for driving the workpiece 2 in the horizontal direction (X-direction), reference numeral 17 is a Y table for driving the workpiece 2 in the horizontal direction (Y-direction), reference numeral 18 is an X-axis servo amplifier for controlling a drive motor not shown for driving the X-table 16, reference numeral 19 is a Y-axis servo amplifier for controlling a drive motor not shown for driving the Y-table 17, reference numeral 20 is an automatic wire connecting device, and reference numeral 21 is a control means. The workpiece 2 is machined as follows. The wire electrode 1a is held and drawn by the capstan roller 14 and the pinch roller 15. While the wire electrode 1a is running, electric power for machining is supplied between the workpiece 2 and the wire electrode 1a from an electric power source not shown, and while the wire electrode 1a and the workpiece 2 are being relatively moved by the X-table and the Y-table which are the positioning means, the workpiece 2 is machined by electric discharge.

Figure 5:
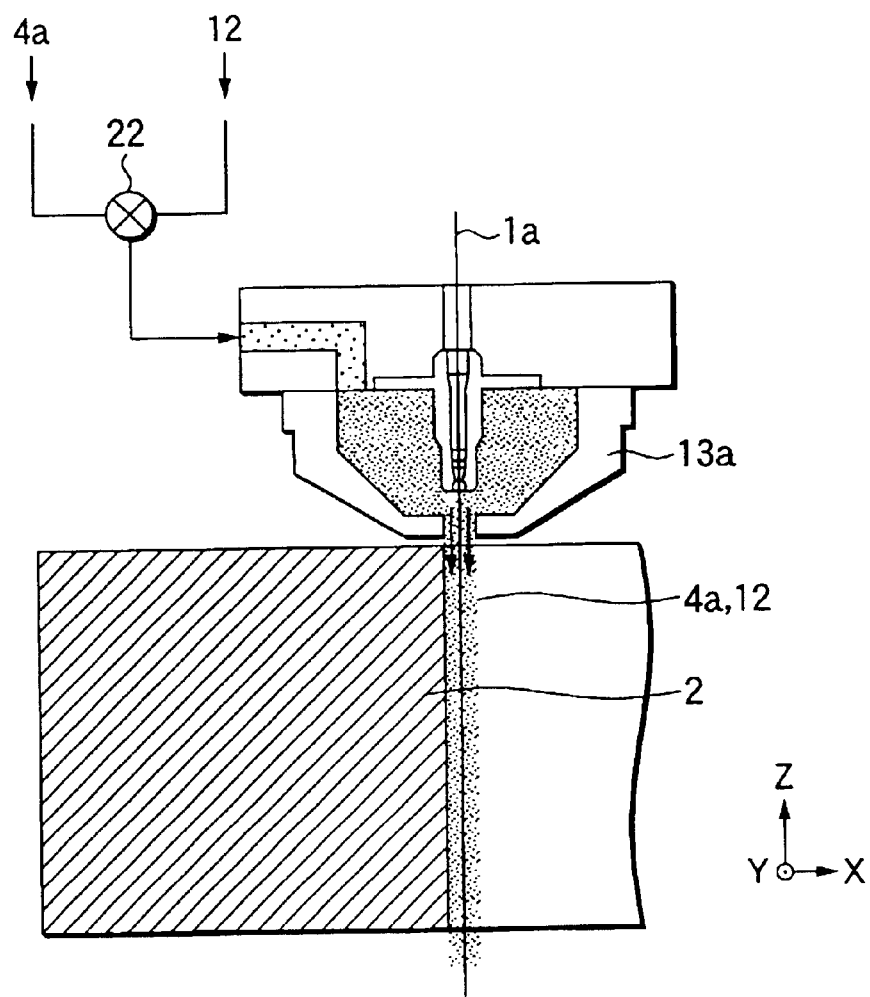
FIG. 5 is a view showing a structure of a machining solution nozzle.

FIG. 5 is a view showing a structure of a machining solution nozzle. The machining solution nozzle 13a is taken as an example and explained below. The structure and operation of the machining solution nozzle 13b are the same as those of the machining solution nozzle 13a. In FIG. 5, reference numeral 22 is a changeover means. Like reference characters are used to indicate like parts in FIGS. 4 and 5. The changeover means 22 is composed of, for example, an electromagnetic valve. When this changeover means 22 is changed over by the control means 21 (shown in FIG. 4), the supply of water 4a or the pressurized gas 12 to the machining solution nozzle 13a can be changed over.

In the process of rough machining shown in FIG. 1A, the changeover means 22 is changed over by the control means 21 so that the water 4a can be supplied to the machining solution nozzle 13a, and electric discharge machining is conducted while the water 4a is being supplied from the machining solution nozzle 13a between the wire electrode 1a and the workpiece 2.

Before the start of the intermediate finish machining process shown in FIG. 1B, the machining solution is ejected from the machining tank after the completion of rough machining shown in FIG. 1A, and the changeover means 22 is changed over by the control means 21 so that the pressurized gas 12 can be supplied to the machining solution nozzle 13a, and the pressurized gas 12 is jetted out from the machining solution nozzle 13a, so that the residual machining solution adhering to the workpiece 2 can be removed, and at the same time the residual machining solution adhering to the machining solution nozzle arranged in an upper portion of the workpiece 2 can be removed.

In the same manner, before the start of the final finishing process shown in FIG. 1C, the pressurized gas 12 is jetted out from the machining solution nozzle 13a, and liquid which has adhered to the workpiece 2 by the deposition of the mist 7 is removed and also liquid which has adhered to the machining solution nozzle arranged in an upper portion of the workpiece 2 is removed.

As described above, as a pressurized gas jetting means for removing the residual machining solution, the pressurized gas 12 is supplied to the machining solution nozzles 13a and 13b, and the pressurized gas 12 is jetted out from these machining solution nozzles 13a and 13b. In this way, the residual machining solution adhering to the workpiece 2 can be effectively removed and also the residual machining solution adhering to the machining solution nozzle arranged in an upper portion of the workpiece 2 can be effectively removed. For example, when the pressurized gas 12 is jetted out from the machining solution nozzle 13a, the residual machining solution adhering to the workpiece 2 can be removed and also liquid adhering inside the machining solution nozzle 13a can be removed. When the pressurized gas 12 is jetted out from the machining solution nozzle 13b, the residual machining solution adhering to the periphery of the machining solution nozzle 13a, the residual machining solution having a possibility of dripping onto a face to be machine of the workpiece 2, can be removed.

Accordingly, deterioration of the machining characteristic caused by the residual machining solution adhering to the workpiece 2 can be effectively suppressed, and also deterioration of the machining characteristic caused by dripping of the residual machining solution adhering to the machining solution nozzle arranged in an upper portion of the workpiece 2 can be effectively suppressed. As a result, it is possible to conduct machining with high reliability.

The pressurized gas jetting means for removing the residual machining solution is not limited to the structure shown in FIG. 5 in which the pressurized gas is jetted out from the machining solution nozzle. It is possible to provide the pressurized gas jetting means separately from the machining solution nozzle.

When a gas supply means for jetting out gas of a predetermined composition between the wire electrode 1a and the workpiece 2 is used in the electric discharge machining conducted in gas as shown in FIG. 1C, the gas supply means can be also used for the pressurized gas jetting means for removing the residual machining solution.

Figure 6A:
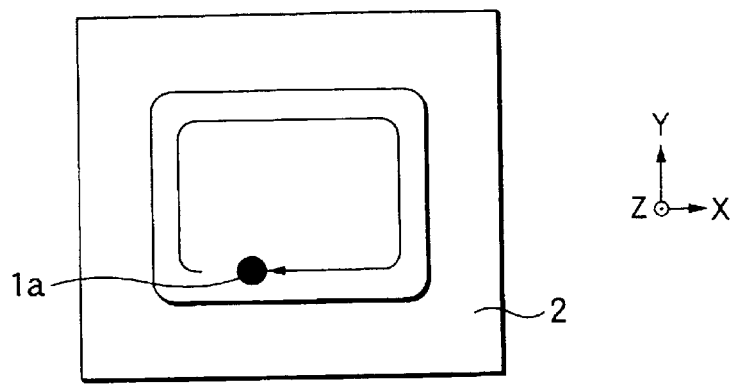
FIGS. 6A to 6C are schematic illustrations showing a removing motion of removing a residual machining solution adhering to a workpiece by a pressurized gas jetting means.
Figure 6B:
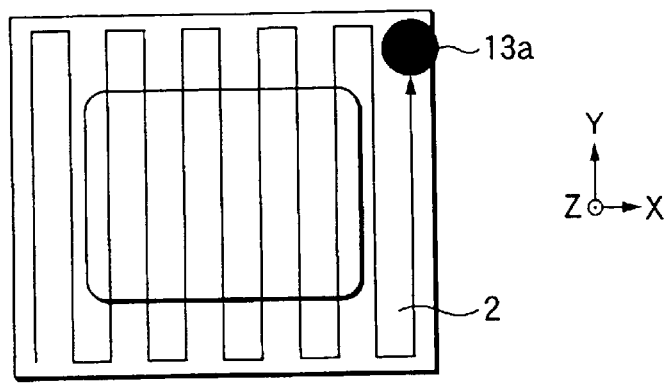
Figure 6C:
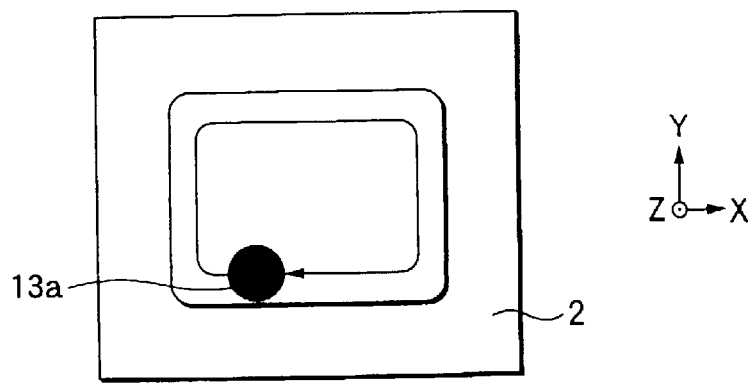

FIGS. 6A to 6C are schematic illustrations showing a removing motion of removing a residual machining solution adhering to a workpiece by a pressurized gas jetting means. In this case, the machining solution nozzle is used for the pressurized gas jetting means. In FIGS. 6A to 6C, reference numeral 1a is a wire electrode, reference numeral 2 is a workpiece and reference numeral 13a is a machining solution nozzle used for the pressurized gas jetting means. The machining solution nozzle 13a and the workpiece 2 can be relatively moved with each other, for example, by the positioning means composed of the X table 16 and the Y table 17 shown in FIG. 4.

The residual machining solution adhering to an upper face of the workpiece 2 can be removed as follows. As shown in FIG. 6A, after the completion of rough machining which is conducted in the machining solution, while giving a step movement corresponding to the diameter of the machining solution nozzle 13a as shown in FIG. 6B, the machining solution nozzle 13a and the workpiece 2 are moved relatively with each other by the positioning means so that the machining solution nozzle 13a can conduct scanning on the entire upper face of the workpiece 2, and the pressurized gas 12 is jetted out from the machining solution nozzle 13a. In this way, the residual machining solution adhering to the upper face of the workpiece 2 can be removed. Next, as shown in FIG. 6C, the machining solution nozzle 13a and the workpiece 2 are relatively moved with each other so that the machining solution nozzle 13a can follow the locus of machining, and the pressurized gas 12 is jetted out from the machining solution nozzle 13a. In this way, the residual machining solution adhering to the face to be machined can be removed. When the pressurized gas 12 is jetted out from the machining solution nozzle 13a as described above, the residual machining solution adhering inside the machining solution nozzle 13a can be simultaneously removed.

The residual machining solution adhering to the periphery of the machining solution nozzle 13a, the residual machining solution having a possibility of dripping onto a face to be machine of the workpiece 2, can be removed in the same manner when the pressurized gas 12 is jetted out from the machining solution nozzle 13b.

In the case where the automatic wire connecting device 20 shown in FIG. 4 is operated, water adhering to the workpiece 2 as shown in FIG. 3 can be removed in the same manner when the pressurized gas 12 is jetted out from the machining solution nozzle 13a.

After the residual machining solution adhering to the upper face and also adhering to the face to be machined of the workpiece 2 has been removed by the method described above and also after the residual machining solution adhering to the machining solution nozzle arranged in an upper portion of the workpiece 2, the residual machining solution having a possibility of dripping onto the face to be machined of the workpiece 2, has been removed by the method described above, electric discharge in mist or electric discharge in gas is conducted on the workpiece 2. Due to the foregoing, the original machining characteristic can be provided.

Figure 7:
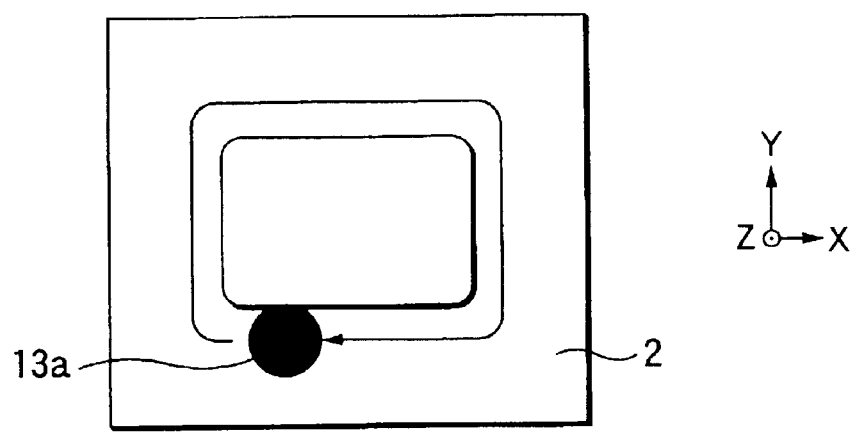
FIG. 7 is a schematic illustration showing a removing motion of removing a residual machining solution from an upper face of a workpiece by a pressurized gas jetting means.
Figure 8A:
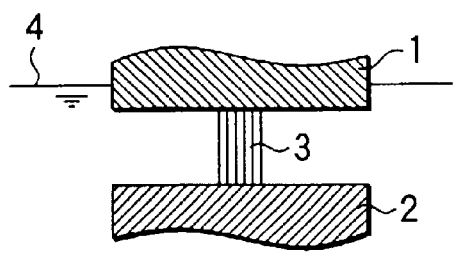
FIGS. 8A to 8E are schematic illustrations showing a mechanism of electric discharge machining.
Figure 8B:
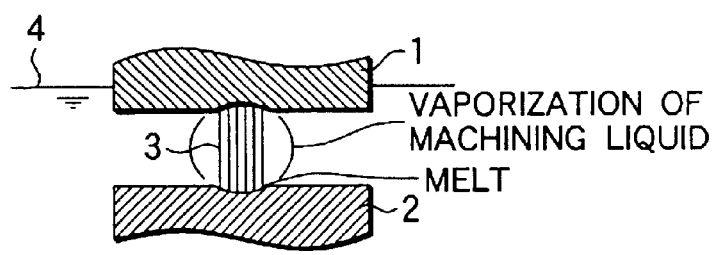
Figure 8C:
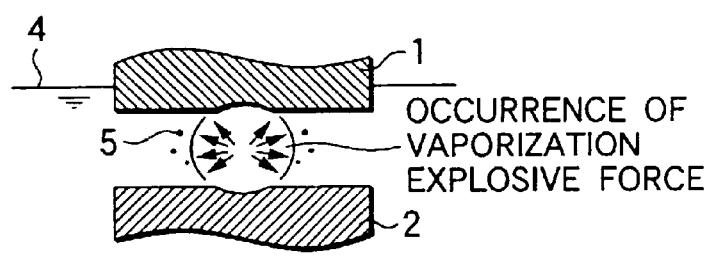
Figure 8D:
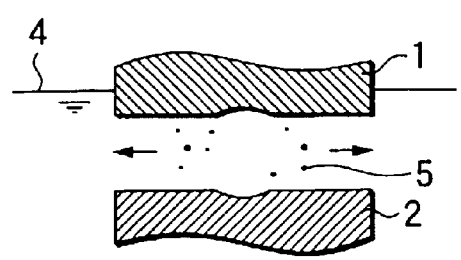
Figure 8E:
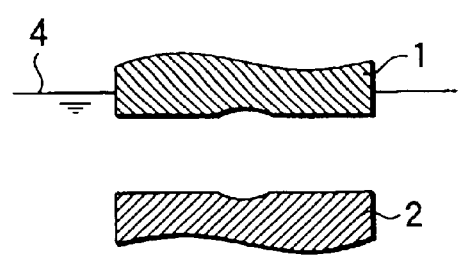

In the above explanations, the residual machining solution on the upper face of the workpiece 2 is removed when the machining solution nozzle 13a, which is a pressurized gas jetting means, is made to conduct scanning on the entire upper face of the workpiece 2 as shown in FIG. 6B. Instead of that, the machining solution nozzle 13a, which is a pressurized gas jetting means, may be moved relatively with the workpiece 2 while a quantity of offset is being changed according to the machining program by which the workpiece 2 has been machined as shown in FIG. 7.

When the above machining program is used, the residual machining solution can be effectively removed in a short period of time. Accordingly, it is possible to reduce waste time in the process of machining. Therefore, the productivity can be enhanced.

INDUSTRIAL APPLICABILITY

As described above, the wire electric discharge machining method of the present invention can be appropriately used for a highly accurate electric discharge machining work.

What is claimed is:

1. A wire electric discharge machining method in which electric discharge is generated between a wire electrode and a workpiece so as to machine the workpiece by electric discharge, comprising the steps of:
   machining the workpiece by performing at least two types of machining including machining in a machining solution, machining in a mist and machining in a gas; and
   removing at least one of the liquid of the machining solution adhering to the workpiece and the liquid of the machining solution capable of dripping onto a machining face of the workpiece,
   wherein the step of removing is performed at least at one of before the start of machining, except for the machining conducted in the machining solution, and after the operation of an automatic wire connecting device for conducting an automatic wire connection wherein the wire electrode is being held by a water column.

2. The wire electric discharge machining method according to claim 1, wherein the operation of the automatic wire connecting device occurs before performing at least one of machining in the mist and machining in the gas.

3. A wire electric discharge machine in which electric discharge is generated between a wire electrode and a workpiece so as to machine the workpiece by electric discharge, comprising:
   at least one of machining solution supply means for supplying a machining solution between the electrodes and mist supply means for supplying a mist between the electrodes;
   pressurized gas jetting means for removing at least one of the liquid of the machining solution adhering to the workpiece and the liquid of the machining solution capable of dripping onto a machining face of the workpiece, at least at one of before the start of machining, except for the machining conducted in the machining solution, and after the operation of an automatic wire connecting device for conducting an automatic wire connection wherein the wire electrode is being held by a water column; and
   positioning means for positioning by relatively moving the workpiece and the pressurized gas jetting means.

4. A wire electric discharge machine in which electric discharge is generated between a wire electrode and a workpiece so as to machine the workpiece by electric discharge, comprising:
   at least two of machining solution supply means for supplying a machining solution between the electrodes, mist supply means for supplying a mist between the electrodes and gas supply means for supplying a gas between the electrodes;
   pressurized gas jetting means for removing at least one of the liquid of the machining solution adhering to the workpiece and the liquid of the machining solution capable of dripping onto a machining face of the workpiece at least at one of before the start of machining, except for the machining conducted in the machining solution, and after the operation of an automatic wire connecting device for conducting an automatic wire connection wherein the wire electrode is being held by a water column; and
   positioning means for positioning by relatively moving the workpiece and the pressurized gas jetting means.

5. A wire electric discharge machine according to claim 3, or 4, wherein the pressurized gas jetting means is a machining solution nozzle capable of changing between supplying the machining solution and supplying the pressurized gas.

6. A wire electric discharge machine according to claim 3, or 4, wherein a relative movement of the workpiece with the pressurized gas jetting means made by the positioning means is conducted according to a program for machining the workpiece.

7. The wire electric discharge machine according to claim 3 or 4, wherein the operation of the automatic wire connecting device occurs before performing at least one of machining in the mist and machining in the gas.

* * * * *